J. T. H. DEMPSTER.
VAPOR ELECTRIC APPARATUS.
APPLICATION FILED APR. 4, 1904.
962,497.
Patented June 28, 1910.
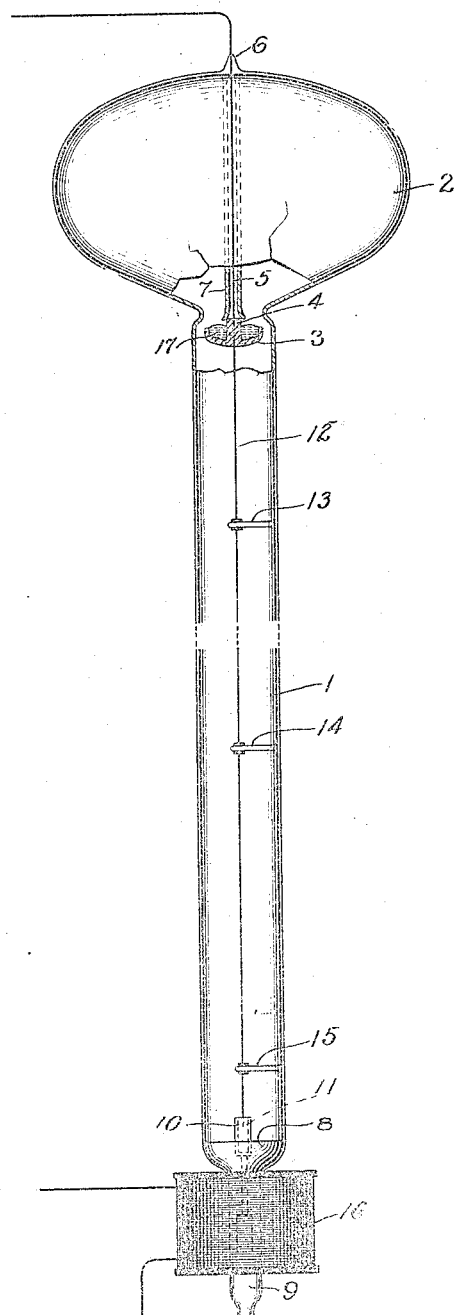
WITNESSES:
INVENTOR:
John T. H. Dempster,
By Albert M. Davis
Att'y

UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

VAPOR ELECTRIC APPARATUS.

962,497.

Specification of Letters Patent. Patented June 28, 1910.

Application filed April 4, 1904. Serial No. 201,488.

*To all whom it may concern:*

Be it known that I, JOHN T. H. DEMPSTER, a citizen of the United States, residing at Schenectady, in the county of Schenectady and State of New York, have invented certain new and useful Improvements in Vapor Electric Apparatus, of which the following is a specification.

My present invention relates to vapor electric devices and more especially to the construction and arrangement of electrodes for use in such devices.

One of the objects of my invention is the production of an electrode which during normal operation shall remain relatively cool. I accomplish this result by rapidly conducting away the heat generated at the electrode and preferably by utilizing this heat to volatilize a suitable fluid contained in the apparatus. The temperature of the electrode is thus maintained, within a certain degree of approximation, at the temperature of volatilization of the fluid.

The features of novelty which characterize my invention are pointed out with particularity in the appended claims. The invention itself, however, will be better understood by reference to the following description taken in connection with the accompanying drawings which represent, by way of illustration, one of the numerous forms which my invention may assume in practice.

In the drawings I have represented my invention as applied to a mercury vapor lamp but it is to be understood that its various features are applicable in numerous other relations, as for example, in vapor electric rectifiers or the like.

The envelop of the lamp consists of a tube 1 of glass or other suitable material, of indefinite length, and provided at some suitable point, as for example at the top of the lamp, with an enlargement 2 constituting a condensing chamber for the vapor generated in the lamp during operation. The anode or positive electrode which I use in the lamp is of novel construction and consists, in one of its forms, of a cup-shaped body 3 of artificial graphite or carbon or of some metal as iron or platinum. A central projection 4 forming a part of the electrode serves as a means of attachment to the supporting conductor 5 which extends through the upper wall of the condensing chamber 2 at 6 where it forms one of the terminals of the lamp. The portion of the conductor between the electrode and the top portion of the condensing chamber 2 is surrounded by a protecting tube or jacket 7 of glass, the lower end of which overlaps the upper end of the projection 4. The portion of the electrode 5 thus surrounded by the tube may if desired be formed of iron and may be welded to a platinum wire passing through the upper wall of the envelop 2, which platinum wire constitutes the leading in conductor.

A body of mercury 8 is located in the lower end of the tube 1 and in a contracted extension 9 thereof and constitutes the negative electrode or cathode of the lamp. In this body of mercury floats a submergible iron armature or core 10, the upper end of which is hollowed out as indicated by the dotted lines 11. A filament of carbon or other suitable material 12 is supported as shown from the lower end of electrode 3 and dips at its lower end into a body of mercury contained in the cup 11 in the top of the plunger or core 10. Guides or centering devices 13, 14 and 15 hold the filament from lateral displacement.

The solenoid 16 connected as shown in series with the lamp operates when energized to submerge the plunger or core 10, and in doing so to lower the mercury carried thereby out of contact with the lower end of the filament 12 and thus start the arc or current flow in the lamp in a manner now well understood.

When the lamp is in operation mercury vapor generated from the cathode is condensed in the chamber 2 in the usual manner in the form of globules. The anode 3 is arranged just below the mouth of the condensing chamber 2, which at this point is somewhat contracted, and thus receives the mercury globules as they roll down the sides of the condensing chamber into the opening into the main tube 1. The annular depression formed in the top of the anode 3 is thus kept filled with the products of condensation of the vapor generated in the main tube 1. The heat generated at the anode operates by conduction through the body of the anode to boil or vaporize the annular body of mercury 17 retained by the anode. Any undue rise in temperature of the anode is immediately checked as it were by an absorption of the heat by the annular body of mercury and a consequent vaporization of the same. The mercury vaporized at the two electrodes of the lamp is condensed in the chamber 2, and automatically keeps the anode supplied with mercury, while any excess over that necessary to fill the annular cup in the anode flows over the side of the anode and is returned to the cathode.

It is obvious that numerous changes may be made in the details of the embodiments of my invention without departing from the spirit thereof, for which reason I do not wish to be limited to the precise arrangements shown and described.

What I claim as new and desire to secure by Letters Patent of the United States, is,

1. In a vapor electric apparatus, the combination of a vaporizable electrode, a solid electrode, and means for applying to the solid electrode condensed matter given off by vaporization from the vaporizable electrode.

2. In a vapor electric apparatus, the combination of a container, a vaporizable electrode in said container, and a fluid retaining solid electrode also in said container, the fluid retaining portion of said solid electrode communicating with the space in which the vaporizable electrode is located.

3. In a vapor electric apparatus, the combination of a vaporizable electrode, a fluid-retaining solid electrode, and means for conducting products of condensation from the vaporizable electrode to the fluid-retaining chamber of the solid electrode.

4. In a vapor electric apparatus, the combination of a condensing chamber forming a part of the container of the apparatus, a vaporizable electrode, and a fluid-retaining solid electrode located so as to intercept products of condensation in their return from the condensing chamber to the vaporizable electrode of the apparatus.

5. In a vapor electric apparatus, the combination of a vaporizable electrode, and a solid electrode located in the same space as the vaporizable electrode and cooled by contact with fluid of the same character as that of the vaporizable electrode, and which at times forms a part of said vaporizable electrode.

In witness whereof, I have hereunto set my hand this first day of April, 1904.

JOHN T. H. DEMPSTER.

Witnesses:
BENJAMIN B. HULL,
HELEN ORFORD.